United States Patent [19]
Means

[11] 3,829,845
[45] Aug. 13, 1974

[54] PROCESS CONTROL METHOD AND APPARATUS

[75] Inventor: David K. Means, Ann Arbor, Mich.

[73] Assignee: Reliance Electric Company, Cleveland, Ohio

[22] Filed: Aug. 24, 1973

[21] Appl. No.: 391,349

[52] U.S. Cl. ......................... 340/172.5, 235/151.1
[51] Int. Cl. ............................................. G06f 3/00
[58] Field of Search ................ 340/172.5; 328/151; 235/151.1

[56] References Cited
UNITED STATES PATENTS
3,651,477    3/1972    Bartlett et al. .................. 340/172.5

*Primary Examiner*—Raulfe B. Zache
*Attorney, Agent, or Firm*—Richard G. Stephens

[57] ABSTRACT

Noise immunity is enhanced in a digital computer controlled process by phase-shifting input signals before they are sampled by the computer to remove high frequency noise using small filters having short time constants, by sensing the phase-shifted signals when they are near their peak amplitudes, which is arranged to occur when line voltage is not at its peak amplitude, then processing the sensed signals and transmitting command signals either the first or a subsequent time after such sensing that the line voltage passes through zero.

14 Claims, 2 Drawing Figures

PROCESS CONTROL METHOD AND APPARATUS

A wide variety of process control systems include data-processing apparatus, such as a digital computer, which repeatedly samples input signals from a multiplicity of sensing devices, such as pressure or temperature sensitive switches, shaft encoders, etc., which provide signals representing various process control parameters. The data-processing apparatus makes various calculations using the input signals and other data or instructions stored in the data-processing apparatus, and then transmits output signals to control various actuating devices, such as motors, solenoids, etc. Typical industrial control systems must be used in an environment which also includes one or more devices which create substantial electrical "noise", or unwanted electrical signals, and because such noise may seriously interfere with process control, much effort has been devoted to techniques tending to immunize such a control system to the effects of such noise. The noise which is generated in many industrial environments includes components covering a wide range of frequencies, with much high frequency noise being generated as electrical arcs occur in various devices, and with noise being more or less constantly generated at the power line frequency (e.g. 60 hertz) with varying phase and amplitude, and both types of noise tend to be inductively or capacitively coupled into the input signal lines leading to the computer. Noise may consist of both "spikes" which increase the signal amplitude and "notches", which decrease the signal amplitude.

One well-known technique for reducing the effects of such noise has been the use of a continuous low-pass or band-pass filter located in each input signal line at the computer sampling circuit. While a proper continuous filter may effectively filter out much of the noise appearing on an input signal line, such filters have tended to be expensive and to occupy considerable space in multi-bit signal systems, since they ordinarily have time-constants long enough to filter out noise which occurs at the power-line or mains frequency.

In addition to those disadvantages, each filter sometimes can operate to integrate noise signals and cause an erroneous input signal if the signal is rectified as well as filtered. Furthermore, the use of a long filter time-constant may undesirably decrease system frequency response. Thus one object of the invention is to provide process control apparatus having substantial noise-immunity which overcomes the mentioned disadvantages of input signal line filtering.

It has been previously proposed (e.g. U.S. Pat. No. 3,651,477) that noise immunity be increased by eliminating such filters and instead sampling each signal line for a brief interval while the AC power-line voltage is substantially at its peak value. The presence or absence of the signal is inferred from the instantaenous voltage level sensed during the sampling interval, and corresponding binary value is stored by the computer sampling system. Such a system avoids the disadvantages mentioned above as attending the use of filters, but has the serious shortcoming that a noise pulse occurring on the signal line during the sampling interval cannot be distinguished from a valid data signal. Further, the probability of repeated false recognition by the sampling logic becomes fairly high, since both the sampling intervals and the various noise sources are synchronized with the power line, and hence synchronized with each other. Merely driving various noise sources such as motors from the power line will tend to synchronize the noise which they produce with the power line. It will be apparent that a repeated erroneous signal is likely to cause more serious consequences than a once-occurring erroneous signal, and that it may cause more serious consequences than one-time errors on a plurality of different signal lines. It is another object of the present invention to provide process control apparatus which overcomes the mentioned disadvantages of the prior line-synchronized data sampling system.

In accordance with a central concept of the present invention, a marked improvement in noise immunity is obtained by filtering each input signal with a filter which provides a predetermined phase shift at the line frequency, and by sampling each filter output not at an instant when the line voltage is substantially at its peak value, but instead at a later time, such as when the filtered and phase-shifted input signal is at or near its peak value. If the filters used ahead of the sampling system have short time-constants, they inherently may occupy little space, be quite inexpensive, they will not appreciably degrade system frequency response, and since they need contain no nonlinear elements, they cannot falsely integrate noise so as to cause a false reading. Thus it is an important object of the invention to provide an improved process control system wherein noise immunity is provided by sampling a phase-shifted input signal in synchronization with the line voltage at a sampling time delayed to occur substantially after the peak of the line voltage. Delaying the sampling time to an interval substantially after the peak of the line voltage also by itself further increases system noise immunity, since most noise sources tend to provide maximum line-related noise when the line voltage is at its peak, so that sampling at a later time when they are providing less noise is likely to result in error.

Other objects of the invention will in part be obvious and will in part appear hereinafter.

The invention accordingly comprises the several steps and the relation of one or more of such steps with features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 1:
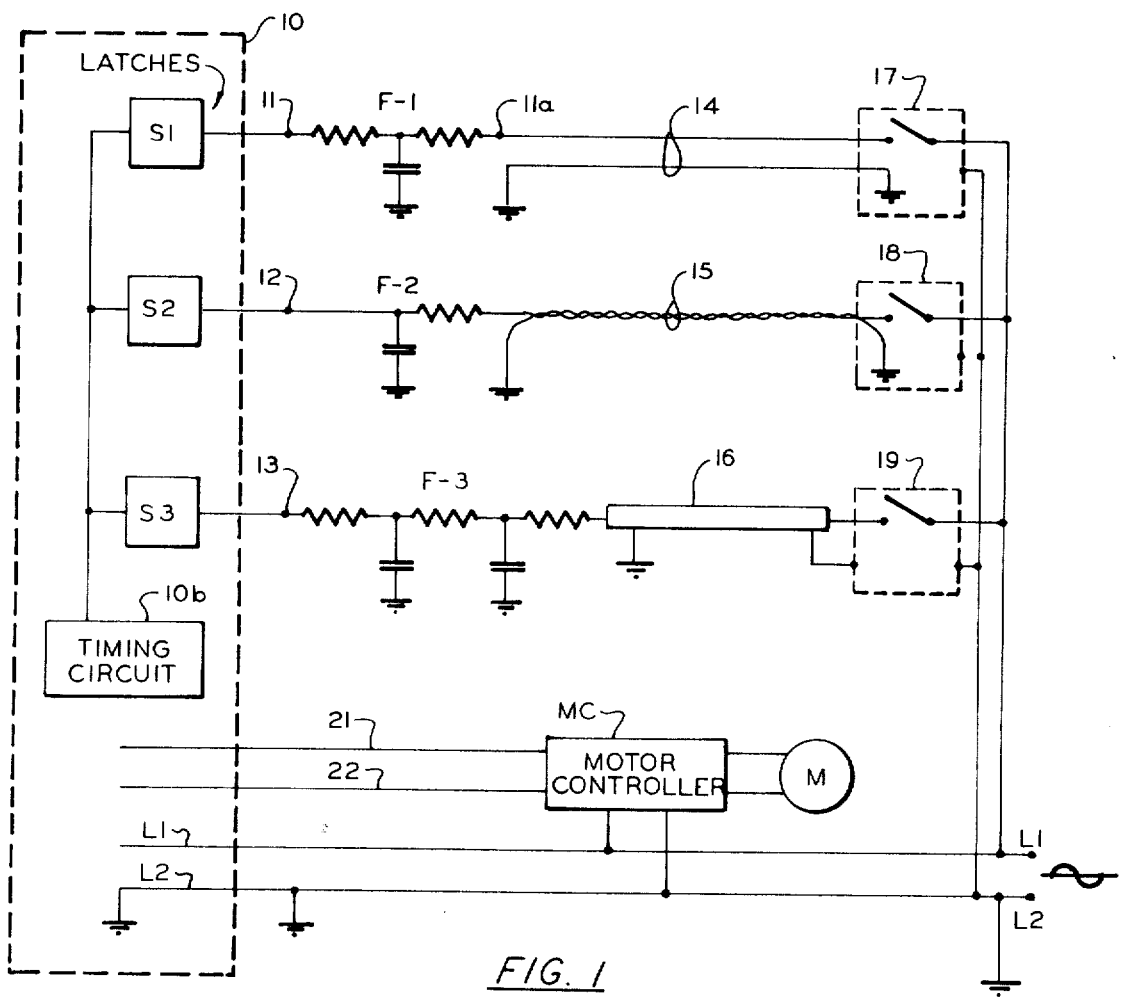
FIG. 1 is a block diagram of a typical process control system incorporating the invention.

In FIG. 1 digital data processor 10, which might comprise any one of a number of general-purpose digital computers or a special-purpose digital computer, includes a sampling circuit shown for sake of simplicity as comprising three latches S1 to S3. It is to be understood that in practice the sampling circuit may comprise the I/O bus of a digital computer, or the input bus where the computer includes separate input and output busses. In some applications the sampling circuit may not comprise a portion of a digital computer per se, but will be included in interface equipment connected to route digital signals to the computer. The function of the sampling circuit is to enable latches S1 to S3 for short intervals at times dictated by timing circuit 10b.

Latches S1 to S3 serve to sense and store the signals at terminals 11, 12 and 13, and to apply them to one or more devices within computer 10. Those skilled in the art will recognize that various forms of other computer elements, such as flip-flops, may be used in lieu of latches.

Input terminals 11–13 are each shown connected through a respective filter (F1, F2, F3) on a respective pair of signal lines 14–16 to a transducer or signal-producing device 17–19. The signal lines may comprise ordinary wiring as at 14, twisted pairs as at 15, or shielded wires such as the coaxial cable indicated at 16. The signal-producing devices typically might be visualized as temperature or pressure operated switches, for example. Typically, each signal-producing device will provide a 110 VAC signal to indicate one binary condition, and zero volts to indicate the opposite binary condition. In some applications the signal lines shown grounded may extend into the sampling circuit and be excited with DC voltages, so that voltages are routed out to each device 17–19 and returned from those of devices 17–19 which have their switches closed. While each of the devices 17–19 in FIG. 1 is shown as producing only a single-bit signal, "1" or "0", it should be understood that groups of signal lines similarly extending to computer 10 may carry multi-bit digital signals, from a rotary brush-disc shaft rotation encoder or other form of analog-to-digital converter, for example. Further, it is to be understood that the sampling circuit need not necessarily sample all of the input terminals each time it operates.

Computer 10 is shown provided with a pair of output lines 21, 22 which are routed to motor controller MC to control motor M. The computer may be provided with many similar output lines over which process control command signals are periodically transmitted by the computer to control a variety of actuators and the like used in the process control system. The computer, the signal-producing devices 17–19, the motor-controller MC and mtoor M are shown connected to a conventional alternating voltage source shown at lines $L_1$ and $L_2$, the latter of which is grounded. It is to be understood that signal-producing devices 17–19, and lines 14–16, and sometimes computer 10, are contained within an environment having substantial electrical noise, much of which may be produced by devices such as motor M.

Figure 2:
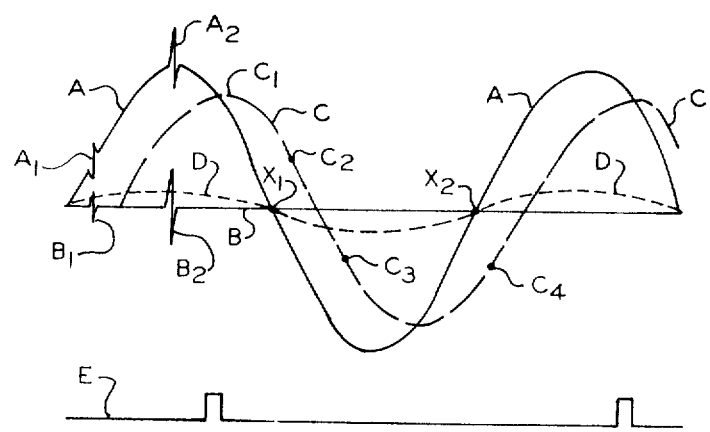
FIG. 2 is a set of waveforms useful in understanding the present invention.

In FIG. 2 waveform A may be deemed to represent a typical voltage received at the input terminal of one of the filters, such as that received at terminal 11a when the switch of device 17 is closed to indicate a particular binary condition. Waveform A, which is in phase with and derived from power line $L_1$, is shown as including some noise represented by spikes at $A_1$ and $A_2$. Such noise might occur, for example, due to characteristics of the signal-producing device represented by the switch at 17, or from inductive or capacitive coupling of noise generated by motor M into signal lines 14, or from a combination of such phenomena. The noise generated at $A_2$ is shown with greater amplitude than that generated at A, because it occurs when the $L_1$ voltage itself has a larger amplitude so that noise sources tend to provide greater noise voltages. Noise also may occur in the signals at terminal 11a when switch 17 is open to indicate an opposite binary condition, and in FIG. 2 baseline B is shown with noise spikes occurring at $B_1$ and $B_2$.

It has been found that the noise picked up in many if not most industrial applications includes very little noise power generated at line frequency compared to the noise power generated at higher frequencies. For example, many noise sources generate significant noise between 20 kilohertz and 2 megahertz, while relatively few generate significant noise power frequencies below 2 kilohertz. Thus in accordance with a central feature of the present invention, filters such as F–1 to F–3 are provided with time constants which are long compared to the average period of the significant noise sources, but short compared to the line frequency, which is ordinarily 60 hertz. Thus such filters, which may be small and economical, may filter a signal such as that shown by waveform A to provide a signal (at terminal 11, for example) of the nature shown by waveform C, from which the high frequency transients have been eliminated, or in the case of an opposite binary condition, to provide a signal of the nature shown at waveform D. Waveform C is shown with less amplitude than waveform A to indicate that the filters do provide some attenuation, and waveform D is shown with a distinct line frequency component to indicate that the filters do not materially filter out line frequency noise or "hum" which might be picked up by the signal lines.

It is important to note that while the filters do not filter out appreciable noise occurring at the line frequency, they do significantly delay or shift the phase of the signals which are sampled. In FIG. 2 waveform C is shown lagging waveform A by approximately 45°, although it is to be understood that filters may be used which will shift a signal of line frequency more than 45° or less than 45°. In most practical applications of the invention each filter will be selected so as to shift a signal of line frequency more than 5°, and typically perhaps 10° or more. It will be understood that the line frequency need not be 60 hertz, and well might be 50 hertz or 400 hertz, for example, in various applications. In accordance with the present invention, the signals at lines 11–13 are sampled for a brief interval a substantial time after the line voltage and waveform A reach their peak values, preferably at about the time waveform C reaches its peak value, although sampling may be arranged to occur after the waveform C peaks, if desired. Sampling at the time of point $C_1$ in FIG. 2 has the advantage that waveform C is then at its peak value, so that a given amount of noise will cause minimum change in the sampled value, but sampling at a later time, such as the time of line crossing $X_1$ in FIG. 2 has the advantage that less noise will tend to be generated at that time by the various noise sources. Whether greatest overall noise immunity will result from sampling at time $C_1$, or at time $X_1$, or even at time $C_4$, or at some time between $C_1$ and $C_4$, will depend upon the character of the noise sources and the characteristics of the signal lines. Thus in most applications of the invention sampling will be arranged to occur sometime between points $C_1$ and $C_4$, but not at the time interval between points such as those shown at $C_2$ and $C_3$ when waveform C has small amplitude values. In FIG. 2 sampling intervals are indicated, with exaggerated widths at time $C_1$, by waveform E. Since the usual line frequency of 60 hertz provides each half-cycle of waveform C with a period of 833 milliseconds, and since a typical contemporary computer can sample a signal in a microsecond or less, it becomes apparent that a large number of signal lines may be sampled during a very small portion of each positive half-cycle of waveform C. It will be apparent that the system could instead be arranged, if desired, to sample during each negative half cycle of wave form C.

The amount of phase shift which each filter provides may vary rather widely in different applications of the invention, and the selection of a given amount of phase shift involves a trade-off between economy or size and the amount of noise reduction. In most applications the filters will be arranged to produce a line-frequency phase shift somewhere between 10° and 90°. Where considerations of economy and/or size are paramount, the filters will have short time-constants, perhaps as small as 0.5 millisecond which will allow a simple L-section RC filter such as that shown at F–2 to provide about 10.7° phase shift of a 60 hertz signal. Such a filter will pass more than 98 percent of a 60 hertz line frequency, but will pass only about 1.8 percent of a 20 kilohertz noise signal, and much less, of course, of a 2 megahertz noise signal. In a typical application a simple L-section filter of the nature shown at F–2 might comprise a series resistance ranging from 100 to 100,000 ohms, which resistance may include the signal line resistance, and a shunt capacitance ranging from 5 to 0.005 microfarad, to provide a 0.5 millisecond time constant. Where considerations of noise reduction are more important, greater amounts of phase shift may be used, and line-frequency phase shift of 90° is ideal. It will be recognized that numerous well-known types of filters may be made, by cascading L-sections, for example, to provide the desired amount of phase shift. It will be apparent that LC filters may be used in lieu of RC filters, although RC filters ordinarily will be preferred due to their lesser expense. In most applications simple low-pass filters will be preferred for sake of simplicity, although the use of band-pass filters sometimes may be deemed desirable. Phase-shifts greater than 90° may be used, but may seldom be necessary. With waveform C shifted 90° from waveform A, waveform A will be passing through zero when the peak value of waveform C is sampled, and the noise generated by the various noise sources will tend to be minimum.

In many applications, addition of a series resistance to a simple L-section filter will be useful, as shown at F–1. Use of the added resistance causes the filter to provide substantially a fixed amount of attenuation at all frequencies, and allows one to convert signals which may have 110-volt amplitudes on lines 14 down to small voltages compatible with TTL, DTL or RTL integrated circuitry. The time constant and phase shift of a simple L-section filter can be selected by varying either one or both R and C, of course, and the precise value of R and C in a given application usually will depend, of course, upon additional system considerations governing the desired impedance level of the filter. The phase shift $\phi$ of a simple L-section filter is given by:

$$\phi = \arctan(\omega RC)$$

and the impedance of such a filter given by:

$$Z = \sqrt{R^2 + (1/\omega C)^2}$$

and thus specifying a desired phase shift and a desired impedance at line frequency $\omega$ and solving the two above equations simultaneously leads on to specific values for R and C, where $$R = [Z^2/(1 + [1/\omega^2 T^2])]^{1/2} \text{ ohms}$$
$$C = [1/Z^2(T^2 + [1/\omega]^2)]^{1/2} \text{ farads}$$

For example, if a 0.5 millisecond time constant is desired to provide a 10.7° phase shift of the line frequency, and if it is desired that the filter have an impedance of 1,000 ohms at line frequency, a resistance value R of 185 ohms and a capacitance value of 2.7 microfarads would be required. Similar considerations also govern more complex filters, of course.

It is to be understood that after each sampling interval (indicated by the pulses of waveform E) the computer processes some or all of the sampled data, and then provides output signals, the control motor M, for example, and like devices. It is desirable that the output signals from the computer be transmitted at a time when the line voltage is either quite low or passing through zero, at either point $X_1$ or point $X_2$ in FIG. 2, for example. If a filter phase shift approaching 90° is used, so that the peak $C_1$ of waveform C barely precedes the $X_1$ zero line-crossing of waveform A, and if sampling is arranged to occur at or near the time of the peak value $C_1$, it will be apparent that insufficient time may remain before the $X_1$ line-crossing for the computer to do the required amount of data processing, and in such a case the computer may be arranged to transmit its output signals at the time of the $X_2$ line-crossing, or even a later line-crossing. If less phase shift is used, and/or if the amount of data processing required between sampling and transmission is sufficiently small, the computer may be arranged to transmit its output signals at the time of the $X_1$ line-crossing. Various methods for timing the computer so that sampling of input signals and transmission of output signals will occur at desired times during the line voltage cycle are well known and need not be described.

It will thus be seen that the objects set forth above, among those made apparent from the preceding description, are efficiently attained. Since certain changes may be made in carrying out the above method and in the constructions set fort without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. The method of controlling a process control system which is powered by an alternating voltage source comprising the steps of continuously filtering a first group of signals representing process control parameters to remove high frequency noise components from said signals and to provide a second group of filtered signals each shifted in phase by a predetermined amount from said voltage source; sensing said second group of signals at a time which is later than the time at which said alternating voltage source is at its maximum amplitude; processing said sensed signals to provide process control command signals; and executing said process control command signals.

2. The method according to claim 1 wherein said step of filtering said first group of signals comprises low-pass filtering said first group of signals.

3. The method according to claim 1 wherein said step of filtering comprises shifting the phase of said first group of signals so that said signals of said second group lag said signals of said first group more than five degrees of a cycle of said alternating voltage source.

4. The method according to claim 1 wherein said alternating voltage source has a frequency of substantially 60 hertz and said step of filtering is operative to provide said signals of said second group each with a phase lagging at least ten degrees behind said alternating voltage source.

5. The method according to claim 1 wherein said step of sensing comprises sampling said signals of said second group at a time when they are substantially at their maximum amplitudes.

6. The method according to claim 1 wherein said step of sensing comprises sampling said signals of said second group during alternate half-cycles of said signals of said second group.

7. The method according to claim 1 wherein said step of executing said process control command signals comprises transmitting said command signals at a time when said alternating voltage source is substantially at its minimum amplitude.

8. The method according to claim 7 wherein said step of processing said sensed signals comprises processing said sensed signals until after the first time at which said voltage source passes through its minimum amplitude after said step of sensing, and wherein said step of executing comprises transmitting said command signals at substantially the second time or a later time at which said voltage source passes through its minimum amplitude after said step of sensing.

9. The method according to claim 7 wherein said step of executing comprises transmitting said command signals at substantially the first time at which said voltage source passes through its minimum amplitude after said step of sensing, and wherein said step of processing comprises processing said sensed signals in between said step of sensing and said step of transmitting.

10. A process control system, comprising, in combination: data-processing apparatus for receiving sensed signals, processing said sensed signals, and providing process control command signals, said apparatus including sampling means for periodically sensing input signals; a plurality of process control parameter sensing means for providing a first group of signals each representative of a process condition; an alternating voltage source connected to power said sensing means and connected to said data-processing apparatus; and a plurality of filter means connected to respective ones of said sensing means to remove high frequency noise components from said signals of said first group and to provide a second group of filtered signals shifted in phase relative to said voltage source, said sampling means being arranged to sense said signals of said second group at a time which is substantially later than the time at which said voltage source is at its maximum amplitude.

11. A system according to claim 10 wherein each of said filter means comprises a low-pass filter.

12. A system according to claim 10 wherein at least one of said filter means comprises a series resistance and a shunt capacitance.

13. A system according to claim 10 wherein said sampling means is arranged to sample said signals of said second group substantially at the time of their peak values.

14. A system according to claim 10 having resistance means associated with at least one of said filters for attenuating the input signal received by said one filter at all frequencies.

* * * * *